US007614734B2

(12) United States Patent
Konno

(10) Patent No.: US 7,614,734 B2
(45) Date of Patent: Nov. 10, 2009

(54) INKJET RECORDING APPARATUS AND METHOD

(75) Inventor: Masaaki Konno, Kanagawa (JP)

(73) Assignee: Fujifilm Corporation, Tokyo (JP)

(*) Notice: Subject to any disclaimer, the term of this patent is extended or adjusted under 35 U.S.C. 154(b) by 509 days.

(21) Appl. No.: 11/439,253

(22) Filed: May 24, 2006

(65) Prior Publication Data

US 2006/0268085 A1 Nov. 30, 2006

(30) Foreign Application Priority Data

May 25, 2005 (JP) ............................ 2005-152770

(51) Int. Cl.
*G01D 11/00* (2006.01)

(52) U.S. Cl. ...................................... 347/100; 347/101

(58) Field of Classification Search .................. 347/15, 347/19.14, 100, 95, 96, 101, 40, 43
See application file for complete search history.

(56) References Cited

U.S. PATENT DOCUMENTS 6,293,643 B1 * 9/2001 Shimada et al. ............... 347/40
6,382,757 B1 5/2002 Kakutani
6,471,348 B1 * 10/2002 Koitabashi .................. 347/100
2005/0057629 A1 * 3/2005 Taguchi et al. ............. 347/100

FOREIGN PATENT DOCUMENTS

JP 11-48462 A 2/1999
JP 11-151821 A 6/1999
JP 11-348322 A 12/1999
JP 2001-121806 A 5/2001
JP 2001179956 * 7/2001
JP 2003-19819 A 1/2003

* cited by examiner

*Primary Examiner*—Manish S Shah
(74) *Attorney, Agent, or Firm*—Birch, Stewart, Kolasch & Birch, LLP

(57) ABSTRACT

The inkjet recording apparatus includes a first ejection device which ejects a droplet of a first ink; and a second ejection device which ejects a droplet of a second ink, the first and second inks being of a same color type, a density of coloring material in the first ink being lower than a density of coloring material in the second ink, wherein a diameter of a first dot formed by the droplet ejected from the first ejection device is smaller than a diameter of a second dot formed by the droplet ejected from the second ejection device.

12 Claims, 9 Drawing Sheets

INKJET RECORDING APPARATUS AND METHOD

BACKGROUND OF THE INVENTION

1. Field of the Invention

The present invention relates to an inkjet recording apparatus and method, and more particularly, to an inkjet recording apparatus and method for performing recording by using a plurality of inks of the same color type and different coloring material densities (dark and light inks).

2. Description of the Related Art

In the field of inkjet recording apparatuses, a method is known in which, in order to obtain color images of higher quality, a plurality of types of inks of the same color type and having different densities (dark and light inks) are used. For example, systems have been proposed in which a high-definition color image is reproduced by using a combination of dark and light inks, by adding the light inks, light cyan (LC) and light magenta (LM), and the like, to a composition based on four colors, black (K), cyan (C), magenta (M) and yellow (Y).

Japanese Patent Application Publication No. 11-48462 discloses technology, for suppressing the occurrence of streak when dark and light inks are used, by using the light inks having higher permeability than the dark inks, or alternatively, by setting the ejection volume of the light inks to be greater than that of the dark inks, and thus making the diameter of the dots of the light inks greater than the diameter of the dots of the dark inks.

Japanese Patent Application Publication Nos. 11-151821, 11-348322, and 2003-019819 disclose technologies for eliminating non-uniformities and resolving restrictions on ink duty, through the selective use of combinations of dark and light inks and large and small dots, in intermediate tones.

Japanese Patent Application Publication No. 2001-121806 discloses technology which reduces the effect of granularity in highlight sections, by increasing the diameter of dots of light ink compared to the diameter of dots of dark ink.

However, the most important factor in the granularity of low-density regions is the visibility of the individual (isolated) dots scattered on the white base surface. In other words, it is desirable for the diameter of the dots of light ink to be smaller, in order to reduce the visibility of the dots in the low-density regions.

Furthermore, in the recording method disclosed in Japanese Patent Application Publication No. 2001-121806, the deposited ink volume becomes large in the Dmax region where ink is deposited to create maximum density on the surface of the recording medium (e.g., paper), and therefore, the permeation of ink solvent into the recording medium can readily give rise to cockling (a phenomenon of undulation or wrinkling of the surface of the recording medium), which means that consideration must be given to drying and fixing processes after the ejection of ink droplets.

SUMMARY OF THE INVENTION

The present invention has been contrived in view of these circumstances, an object thereof being to provide an inkjet recording apparatus and method whereby granularity can be reduced, as well as reducing the volume of ink deposited in the Dmax region.

In order to attain the aforementioned object, the present invention is directed to an inkjet recording apparatus, comprising: a first ejection device which ejects a droplet of a first ink; and a second ejection device which ejects a droplet of a second ink, the first and second inks being of a same color type, a density of coloring material in the first ink being lower than a density of coloring material in the second ink, wherein a diameter of a first dot formed by the droplet ejected from the first ejection device is smaller than a diameter of a second dot formed by the droplet ejected from the second ejection device.

By causing the surface area of the dots formed by the first ink of relatively low density to be a small surface area, it is possible to lessen the effect of granularity in the low-density regions (highlight regions). Furthermore, by causing the surface area of the dots formed by the second ink of relatively high density to be a large surface area, it is possible to suppress the volume of ink deposited in the Dmax regions.

A compositional embodiment of the first ejection device and the second ejection device is a full line type head having a nozzle row in which a plurality of ejection ports (nozzles) are arranged through a length corresponding to the full width of the recording medium. In this case, a mode may be adopted in which a plurality of relatively short ejection head modules having nozzles rows which do not reach a length corresponding to the full width of the recording medium are combined and joined together, thereby forming nozzle rows of a length that correspond to the full width of the recording medium.

A full line type head is usually disposed in a direction that is perpendicular to the relative feed direction (relative conveyance direction) of the recording medium, but a mode may also be adopted in which the head is disposed following an oblique direction that forms a prescribed angle with respect to the direction perpendicular to the conveyance direction.

"Recording medium" indicates a medium which receives the deposition of ink ejected from the first and second ejection devices (this medium may also be called a print medium, image forming medium, image receiving medium, ejection receiving medium, or the like). This term includes various types of media, irrespective of material and size, such as continuous paper, cut paper, sealed paper, resin sheets, such as OHP sheets, film, cloth, an intermediate transfer medium, a printed circuit board on which a wiring pattern, or the like, is formed, and so on.

The movement device for causing the recording medium and the first and second ejection devices to move relatively to each other may include a mode where the recording medium is conveyed with respect to a stationary (fixed) ejection device, or a mode where an ejection device is moved with respect to a stationary recording medium, or a mode where both the ejection device and the recording medium are moved. When forming color images by means of an inkjet print head, it is possible to provide print heads (ejection devices) for each color of a plurality of colored inks (recording liquids), or it is possible to eject inks of a plurality of colors, from one print head.

In other words, it is possible to compose the first ejection device and the second ejection device by means of separate ejection heads, or to adopt a composition which is capable of ejecting different types of inks (a first ink and a second ink) from the same (integrated) head.

Preferably, a surface tension of the first ink is greater than a surface tension of the second ink.

The method of controlling the dot size (dot diameter) by means of the ink properties includes a mode in which the surface tension is differentiated between the first ink and the second ink. When the same volume of ink is deposited, of the first ink and the second ink, then the diameter of the dot formed by the first ink which has higher surface tension will be smaller than the diameter of the dot formed by the second ink.

Preferably, an angle of contact of the first ink on a recording medium is greater than an angle of contact of the second ink on the recording medium.

The method of controlling the dot size (dot diameter) by means of the ink properties includes a mode in which the angle of contact of the ink with respect to the recording medium is differentiated. When the same volume of ink, of the first ink and the second ink, is ejected and deposited on the recording medium, then the diameter of the dot formed by the first ink which has a larger angle of contact with respect to the surface of the recording medium will be smaller than the diameter of the dot formed by the second ink.

Preferably, a viscosity of the first ink is greater than a viscosity of the second ink.

The method of controlling the dot size (dot diameter) by means of the ink properties includes a mode in which the viscosity of the ink is differentiated. When the same volume of ink is deposited, of the first ink and the second ink, then the diameter of the dot formed by the first ink which has higher viscosity will be smaller than the diameter of the dot formed by the second ink.

Preferably, the inkjet recording apparatus further comprises a treatment liquid deposition device which deposits a treatment liquid onto the recording medium, the treatment liquid insolubilizing the coloring material or preventing dispersion of the coloring material.

By using a treatment liquid which insolubilizes the coloring material by reacting with the ink, or a treatment liquid which prevents the dispersion of the coloring material, it is possible to prevent landing interference when printing at high speed, as well as being able to improve the removability of the solvent.

The treatment liquid deposition device may be a device which ejects the treatment liquid in the form of droplets, by using an ejection head of the inkjet type, a device which applies the treatment liquid by means of a roller, a brush, a blade-shaped member, a porous member, or the like, a device which applies a treatment liquid by spraying a mist, or a suitable combination of these.

In a composition where treatment liquid is deposited using an inkjet type of ejection head, it is possible to deposit the treatment liquid selectively by restricting same to the ink ejection regions (printing locations) on the recording medium, on the basis of the image data for printing, and hence the amount of treatment liquid consumed can be reduced in comparison with an application device based on a roller, or the like.

On the other hand, a device which applies the treatment liquid by causing a member, such as a roller, to make contact with the recording medium has a merit in that it can be used with a treatment liquid having a high viscosity of a level which is difficult to eject from an inkjet type ejection head.

Preferably, an angle of contact of the first ink with respect to the treatment liquid having been deposited on the recording medium is greater than an angle of contact of the second ink with respect to the treatment liquid having been deposited on the recording medium.

In the case of a system using a treatment liquid, the method of controlling the dot size (dot diameter) by means of the ink properties includes a mode in which the angle of contact of the ink with respect to the treatment liquid that has been deposited on the recording medium is differentiated. When the same volume of ink, of the first ink and the second ink, is ejected and deposited on the recording medium, then the diameter of the dot formed by the first ink which has a larger angle of contact with respect to the surface of the recording medium on which treatment liquid has been deposited will be smaller than the diameter of the dot formed by the second ink.

Preferably, the diameter of the first dot is made to be smaller than the diameter of the second dot, by differentiating types of surfactant added to the first ink and the second ink.

It is possible to differentiate the surface tension or the angle of contact of the first ink and the second ink, by selecting the type of surfactant added to the ink.

Preferably, the diameter of the first dot is made to be smaller than the diameter of the second dot, by differentiating amounts of surfactant added to the first ink and the second ink.

Instead of a mode in which the type of surfactant added to the ink is differentiated, or in combination with this mode, it is also possible to differentiate the surface tension or angle of contact of the first ink and the second ink, by altering the addition range of the surfactant.

Preferably, the density of coloring material in the first ink is 1 wt % to 5 wt %, and the density of coloring material in the second ink is 6 wt % to 20 wt %.

Desirably, the second ink of relatively high density has sufficient density of coloring material to obtain a prescribed density Dmax, even if the dot diameter is large. On the other hand, desirably, the first ink of relatively low density has a density of ⅙ to ¼ with respect to the density of coloring material in the second ink.

Preferably, the inkjet recording apparatus further comprises a drive signal application device which applies drive signals of a same drive waveform to the first ejection device and the second ejection device, in order to eject the droplet to form the first dot and the droplet to form the second dot.

Since it is possible to control the diameter of the dots of the first ink and the diameter of the dots of the second ink, by means of the ink properties, then there is no requirement to provide an additional function for controlling the ink ejection volume, in the ejection head, and a common ejection drive waveform can be used for both of the inks.

In order to attain the aforementioned object, the present invention is also directed to an inkjet recording method of forming an image on a recording medium, comprising: a first ejection step of ejecting a droplet of a first ink; and a second ejection step of ejecting a droplet of a second ink, the first and second inks being of a same color type, a density of coloring material in the first ink being lower than a density of coloring material in the second ink, wherein a diameter of a first dot formed by the droplet ejected in the first ejection step is smaller than a diameter of a second dot formed by the droplet ejected in the second ejection step.

According to the present invention, it is possible to reduce the appearance of granularity in low-density regions, and to reduce the volume of ink deposited in the Dmax region, and it is also possible to achieve high-quality image recording.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

General Composition of Inkjet Recording Apparatus

Figure 1:
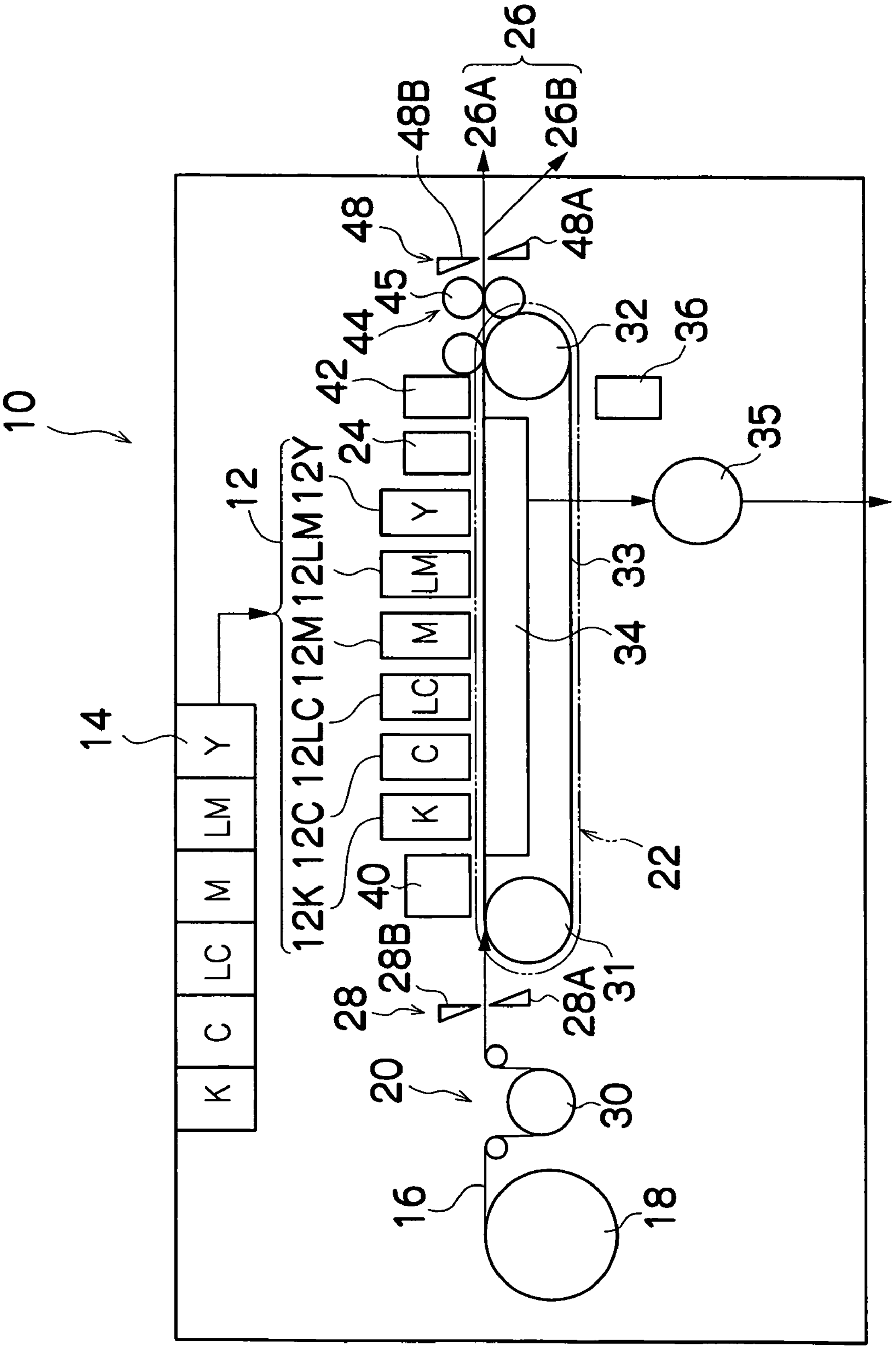
FIG. 1 is a general schematic drawing of an inkjet recording apparatus according to an embodiment of the present invention.

FIG. 1 is a diagram of the general composition of an inkjet recording apparatus according to an embodiment of the present invention. As shown in FIG. 1, the inkjet recording apparatus 10 comprises: a print unit 12 having a plurality of inkjet recording heads (hereafter, called "heads") 12K, 12C, 12LC, 12M, 12LM and 12Y provided for ink colors of black (K), cyan (C), light cyan (LC), magenta (M), light magenta (LM) and yellow (Y), respectively; an ink storing and loading unit 14 for storing inks of K, C, LC, M, LM and Y to be supplied to the print heads 12K, 12C, 12LC, 12M, 12LM and 12Y; a paper supply unit 18 for supplying recording paper 16 forming a recording medium; a decurling unit 20 removing curl in the recording paper 16; a suction belt conveyance unit (corresponding to a conveyance device) 22 disposed facing the nozzle face (ink-droplet ejection face) of the print unit 12, for conveying the recording paper 16 while keeping the recording paper 16 flat; a print determination unit 24 for reading the printed result produced by the print unit 12; and a paper output unit 26 for outputting image-printed recording paper (printed matter) to the exterior.

In FIG. 1, a magazine for rolled paper (continuous paper) is shown as an example of the paper supply unit 18; however, a plurality of magazines with papers of different paper width and quality may be jointly provided. Moreover, papers may be supplied in cassettes that contain cut papers loaded in layers and that are used jointly or in lieu of magazines for rolled papers.

In the case of a configuration in which a plurality of types of recording paper can be used, it is preferable that an information recording medium such as a bar code and a wireless tag containing information about the type of recording medium is attached to the magazine, and by reading the information contained in the information recording medium with a predetermined reading device, the type of recording medium to be used is automatically determined, and ink-droplet ejection is controlled so that the ink-droplets are ejected in an appropriate manner in accordance with the type of medium.

The recording paper 16 delivered from the paper supply unit 18 retains curl due to having been loaded in the magazine. In order to remove the curl, heat is applied to the recording paper 16 in the decurling unit 20 by a heating drum 30 in the direction opposite to the curl direction in the magazine. At this time, the heating temperature is preferably controlled in such a manner that the recording paper has a curl in which the surface on which the print is to be made is slightly rounded in the outward direction.

In the case of the configuration in which roll paper is used, a cutter (a first cutter) 28 is provided as shown in FIG. 1, and the roll paper is cut into a desired size by the cutter 28. The cutter 28 has a stationary blade 28A, of which length is not less than the width of the conveyor pathway of the recording paper 16, and a round blade 28B, which moves along the stationary blade 28A. The stationary blade 28A is disposed on the reverse side of the printed surface of the recording paper 16, and the round blade 28B is disposed on the printed surface side across the conveyance path. When cut paper is used, the cutter 28 is not required.

After decurling, the cut recording paper 16 is delivered to the suction belt conveyance unit 22. The suction belt conveyance unit 22 has a configuration in which an endless belt 33 is set around rollers 31 and 32 so that the portion of the endless belt 33 facing at least the nozzle face of the print unit 12 and the sensor face of the print determination unit 24 forms a horizontal plane (flat plane).

The belt 33 has a width that is greater than the width of the recording paper 16, and a plurality of suction restrictors (not shown) are formed on the belt surface. A suction chamber 34 is disposed in a position facing the sensor surface of the print determination unit 24 and the nozzle surface of the printing unit 12 on the interior side of the belt 33, which is set around the rollers 31 and 32, as shown in FIG. 1; and a negative pressure is generated by sucking air from the suction chamber 34 by means of a fan 35, thereby the recording paper 16 on the belt 33 is held by suction. In place of a suction system, an electrostatic attraction system may be employed as conveyance means.

The belt 33 is driven in the clockwise direction in FIG. 1 by the motive force of a motor 88 (shown in FIG. 7) being transmitted to at least one of the rollers 31 and 32, which the belt 33 is set around, and the recording paper 16 held on the belt 33 is conveyed from left to right in FIG. 1.

Since ink adheres to the belt 33 when a marginless print job or the like is performed, a belt-cleaning unit 36 is disposed in a predetermined position (a suitable position outside the printing area) on the exterior side of the belt 33. Although the details of the configuration of the belt-cleaning unit 36 are not shown, examples thereof include a configuration in which the belt 33 is nipped with a brush roller and a water absorbent roller, an air blow configuration in which clean air is blown onto the belt 33, or a combination of these. In the case of the configuration in which the belt 33 is nipped with the cleaning roller, it is preferable to make the linear velocity of the cleaning roller different to that of the belt 33, in order to improve the cleaning effect.

Instead of the suction belt conveyance unit 22, it might also be possible to use a roller nip conveyance mechanism, but since the printing area passes through the roller nip, the printed surface of the paper makes contact with the rollers immediately after printing, and hence smearing of the image is liable to occur. Therefore, the suction belt conveyance mechanism in which nothing comes into contact with the image surface in the printing area is preferable.

A heating fan 40 is provided on the upstream side of the print unit 12 in the paper conveyance path formed by the suction belt conveyance unit 22. This heating fan 40 blows heated air onto the recording paper 16 before printing, and thereby heats up the recording paper 16. Heating the recording paper 16 before printing means that the ink will dry more readily after landing on the paper.

The heads 12K, 12C, 12LC, 12M, 12LM and 12Y of the print unit 12 are full line heads having a length corresponding to the maximum width of the recording medium 16 used with the inkjet recording apparatus 10, and comprising a plurality of nozzles for ejecting ink arranged on a nozzle face through a length exceeding at least one edge of the maximum-size recording medium (namely, the full width of the printable range).

The print heads 12K, 12C, 12LC, 12M, 12LM and 12Y are arranged in this color order (black (K), cyan (C), light cyan (LC), magenta (M), light magenta (LM), yellow (Y)) from the upstream side in the conveyance direction (feed direction) of the recording paper 16, and these respective heads 12K, 12C, 12LC, 12M, 12LM and 12Y are fixed extending in a direction substantially perpendicular to the conveyance direction of the recording paper 16.

The ink storing and loading unit 14 has ink tanks for storing the inks of K, C, LC, M, LM and Y to be supplied to the heads 12K, 12C, 12LC, 12M, 12LM and 12Y, and the tanks are connected to the heads 12K, 12C, 12LC, 12M, 12LM and 12Y by means of prescribed channels. The ink storing and loading unit 14 has a warning device (for example, a display device or an alarm sound generator) for warning when the remaining amount of any ink is low, and has a mechanism for preventing loading errors among the colors.

In other words, in the present embodiment, the four colors of K, C, M and Y are taken as a basic composition, and furthermore, each of the cyan system and the magenta system uses two types of ink of different coloring material density, in other words, a dark ink of relatively high density (dark cyan ink or dark magenta ink), and a light ink of relatively low density (light cyan ink or light magenta ink).

Looking specifically at the cyan inks, the head 12LC which ejects light cyan ink (corresponding to the first ink) is equivalent to the "first ejection device", and the head 12C which ejects dark cyan ink (corresponding to the second ink) is equivalent to the "second ejection device". Looking specifically at the magenta inks, the head 12LM which ejects light magenta ink (corresponding to the first ink) is equivalent to the "first ejection device", and the head 12M which ejects dark magenta ink (corresponding to the second ink) is equivalent to the "second ejection device".

A color image can be formed on the recording paper 16 by ejecting inks from the heads 12K, 12C, 12LC, 12M, 12LM and 12Y, respectively, onto the recording paper 16 while the recording paper 16 is conveyed by the suction belt conveyance unit 22.

By adopting a configuration in which the full line heads 12K, 12C, 12LC, 12M, 12LM and 12Y having nozzle rows covering the full paper width are provided for the respective colors in this way, it is possible to record an image on the full surface of the recording paper 16 by performing just one operation of relatively moving the recording paper 16 and the printing unit 12 in the paper conveyance direction (the sub-scanning direction), in other words, by means of a single sub-scanning action. Higher-speed printing is thereby made possible and productivity can be improved in comparison with a shuttle type head configuration in which a recording head reciprocates in the direction perpendicular to the paper conveyance direction.

The present embodiment has a six-color configuration including the colors of light cyan (LC) and light magenta (LM) in addition to the standard four colors of K, C, M and Y, but the present embodiment is not limited in terms of the combination of ink colors or the number of ink colors used. For example, it is also possible to adopt a configuration in which other light inks or dark inks are added, or other special inks, such as red or blue are added, and a configuration may also be adopted in which any of the ink colors is removed. The number of heads is selected according to the number of colors used, but it is not always necessary to provide one head per color, and it is also possible to provide a plurality of heads which eject ink of the same color, or provide nozzle row ejecting inks of different colors within the same head. Furthermore, there are no particular restrictions of the sequence in which the heads of respective colors are arranged.

The print determination unit 24 shown in FIG. 1 has an image sensor for capturing an image of the ink-droplet deposition result of the printing unit 12, and functions as a device to check for ejection defects such as clogs of the nozzles in the printing unit 12 from the ink-droplet deposition results evaluated by the image sensor.

The print determination unit 24 of the present embodiment is configured with at least a line sensor having rows of photoelectric transducing elements with a width that is greater than the ink-droplet ejection width (image recording width) of the heads 12K, 12C, 12LC, 12M, 12LM and 12Y This line sensor has a color separation line CCD sensor including a red (R) sensor row composed of photoelectric transducing elements (pixels) arranged in a line provided with an R filter, a green (G) sensor row with a G filter, and a blue (B) sensor row with a B filter. Instead of a line sensor, it is possible to use an area sensor composed of photoelectric transducing elements which are arranged two-dimensionally.

A test pattern or the target image printed by the print heads 12K, 12C, 12LC, 12M, 12LM, and 12Y of the respective colors is read in by the print determination unit 24, and the ejection performed by each head is determined. The ejection determination includes detection of the ejection, measurement of the dot size, and measurement of the dot formation position.

A post-drying unit 42 is disposed following the print determination unit 24. The post-drying unit 42 is a device to dry the printed image surface, and includes a heating fan, for example. It is preferable to avoid contact with the printed surface until the printed ink dries, and a device that blows heated air onto the printed surface is preferable.

In cases in which printing is performed with dye-based ink on porous paper, blocking the pores of the paper by the application of pressure prevents the ink from coming contact with ozone and other substance that cause dye molecules to break down, and has the effect of increasing the durability of the print.

A heating/pressurizing unit 44 is disposed following the post-drying unit 42. The heating/pressurizing unit 44 is a device to control the glossiness of the image surface, and the image surface is pressed with a pressure roller 45 having a predetermined uneven surface shape while the image surface is heated, and the uneven shape is transferred to the image surface.

The printed matter generated in this manner is outputted from the paper output unit 26. The target print (i.e., the result of printing the target image) and the test print are preferably outputted separately. In the inkjet recording apparatus 10, a sorting device (not shown) is provided for switching the outputting pathways in order to sort the printed matter with the target print and the printed matter with the test print, and to send them to paper output units 26A and 26B, respectively. When the target print and the test print are simultaneously formed in parallel on the same large sheet of paper, the test print portion is cut and separated by a cutter (second cutter) 48. The cutter 48 is disposed directly in front of the paper output unit 26, and is used for cutting the test print portion from the target print portion when a test print has been performed in the blank portion of the target print. The structure of the cutter 48 is the same as the first cutter 28 described above, and has a stationary blade 48A and a round blade 48B.

Although not shown in FIG. 1, the paper output unit 26A for the target prints is provided with a sorter for collecting prints according to print orders.

Structure of Head

Next, the structure of a head is described. The heads 12K, 12C, 12LC, 12M, 12LM and 12Y of the respective ink colors have the same structure, and a reference numeral 50 is hereinafter designated to any of the heads.

Figure 2A:
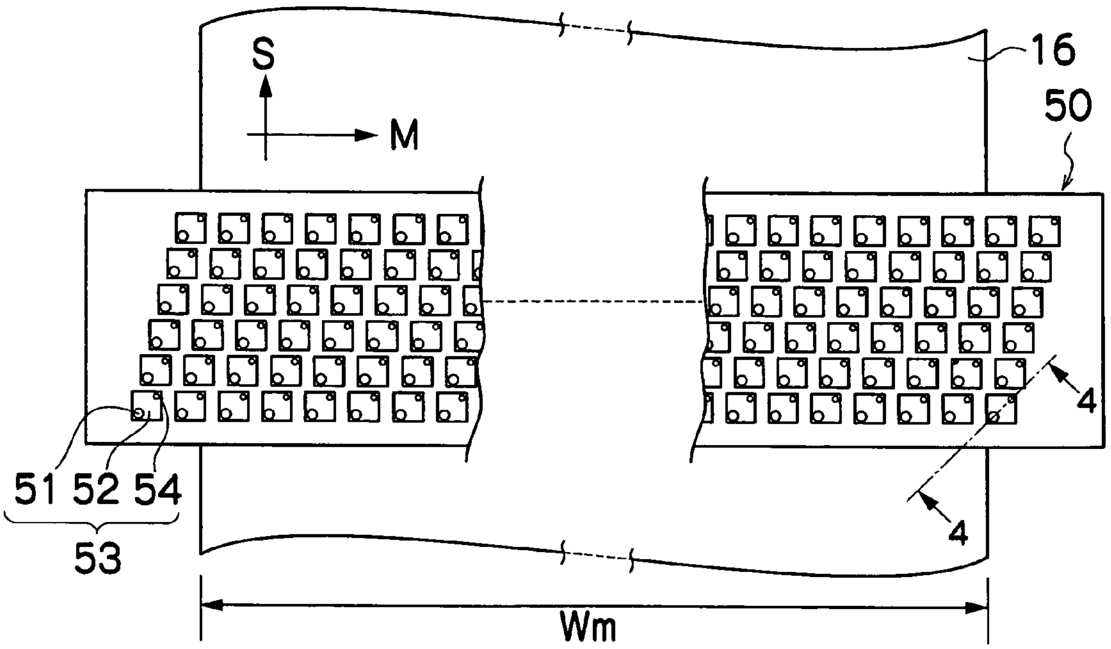
FIGS. 2A and 2B are plan view perspective diagrams showing an embodiment of the composition of a print head in the inkjet recording apparatus shown in FIG. 1.
Figure 2B:
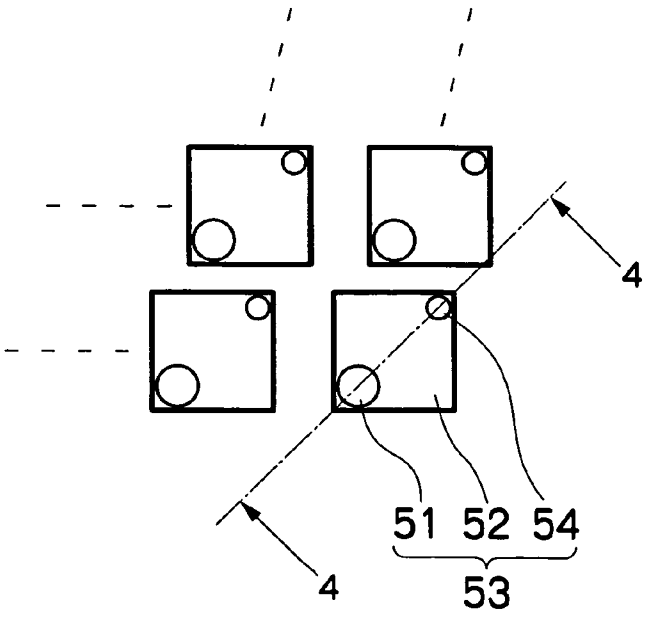

FIG. 2A is a perspective plan view showing an example of the configuration of the head 50, FIG. 2B is an enlarged view of a portion thereof. The nozzle pitch in the head 50 should be minimized in order to maximize the resolution of the dots printed on the surface of the recording paper 16. As shown in FIGS. 2A and 2B, the head 50 according to the present embodiment has a structure in which ink chamber units (droplet ejection elements) 53, each comprising a nozzle 51 forming an ink droplet ejection port, a pressure chamber 52 corresponding to the nozzle 51, and the like, are disposed two-dimensionally in the form of a staggered matrix, and hence the effective nozzle interval (the projected nozzle pitch) as projected in the lengthwise direction of the head (the direction perpendicular to the paper conveyance direction) is reduced and high nozzle density is achieved.

Figure 3:
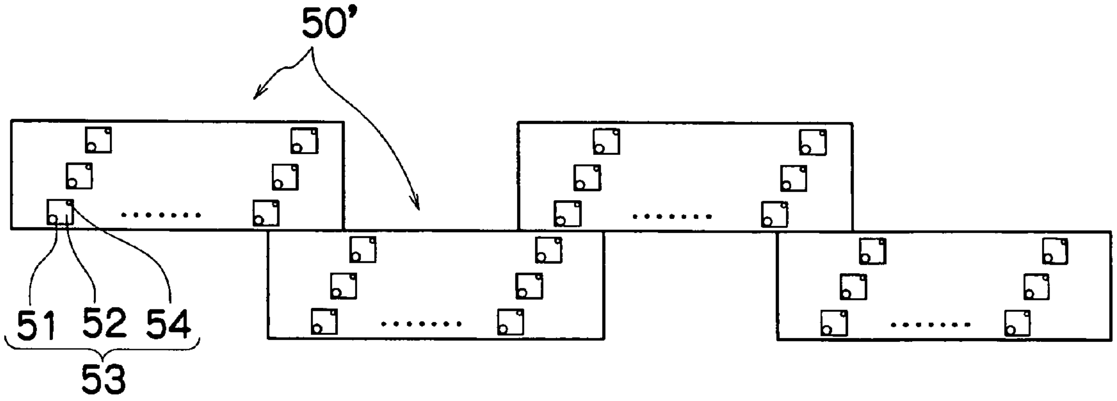
FIG. 3 is a diagram showing a further embodiment of the composition of a full line head.

The mode for constituting nozzle rows equal to or exceeding a length corresponding to the full width Wm of the recording paper 16 in a direction (indicated by arrow M; main scanning direction) which is substantially perpendicular to the feed direction of the recording paper 16 (indicated by arrow S; sub-scanning direction) is not limited to the embodiment shown in FIG. 2A. For example, instead of the composition in FIG. 2A, a line head having nozzle rows of a length corresponding to the entire width of the recording paper 16 can be formed by arranging and combining, in a staggered matrix, short head modules 50' each having a plurality of nozzles 51 arrayed in a two-dimensional fashion as shown in FIG. 3.

As shown in FIGS. 2A and 2B, the planar shape of the pressure chamber 51 provided corresponding to each nozzle 52 is substantially a square shape, and an outlet port to the nozzle 51 is provided at one of the ends of a diagonal line of the planar shape, while an inlet port (supply port) 54 for supplying ink is provided at the other end thereof. The shape of the pressure chamber 52 is not limited to that of the present example and various modes are possible in which the planar shape is a rhombic shape, a rectangular shape, a pentagonal shape, a hexagonal shape, or other polygonal shape, or a circular shape, elliptical shape, or the like.

Figure 4:
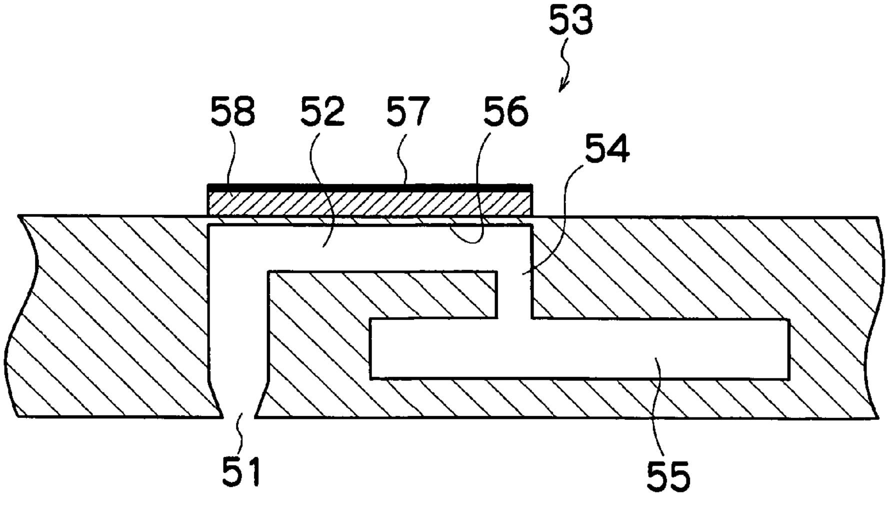
FIG. 4 is a cross-sectional view along line 4-4 in FIGS. 2A and 2B.

FIG. 4 is a cross-sectional diagram along line 4-4 in the FIGS. 2A and 2B and shows the three-dimensional composition of one of the droplet ejection elements (an ink chamber unit corresponding to one nozzle 51). As shown in FIG. 4, each pressure chamber 52 is connected to a common channel 55 through the supply port 54. The common channel 55 is connected to an ink tank 60 (not shown in FIG. 4, but shown in FIG. 6), which is a base tank that supplies ink, and the ink supplied from the ink tank is delivered through the common flow channel 55 in FIG. 4 to the pressure chambers 52.

An actuator 58 provided with an individual electrode 57 is bonded to a pressure plate 56 (a diaphragm that also serves as a common electrode) which forms a part of the surface of the pressure chamber 52 (top part in FIG. 4). When a drive voltage is applied to the individual electrode 57, the actuator 58 is deformed, the volume of the pressure chamber 52 is thereby changed, and the pressure in the pressure chamber 52 is thereby changed, so that the ink inside the pressure chamber 52 is thus ejected through the nozzle 51. When the displacement of the actuator 58 returns to its original position after ejecting ink, the pressure chamber 52 is replenished with new ink from the common flow channel 55 through the supply port 54. For the actuator 58, it is possible to adopt a piezoelectric element using a piezoelectric body, such as lead zirconate titanate, barium titanate, or the like.

Figure 5:
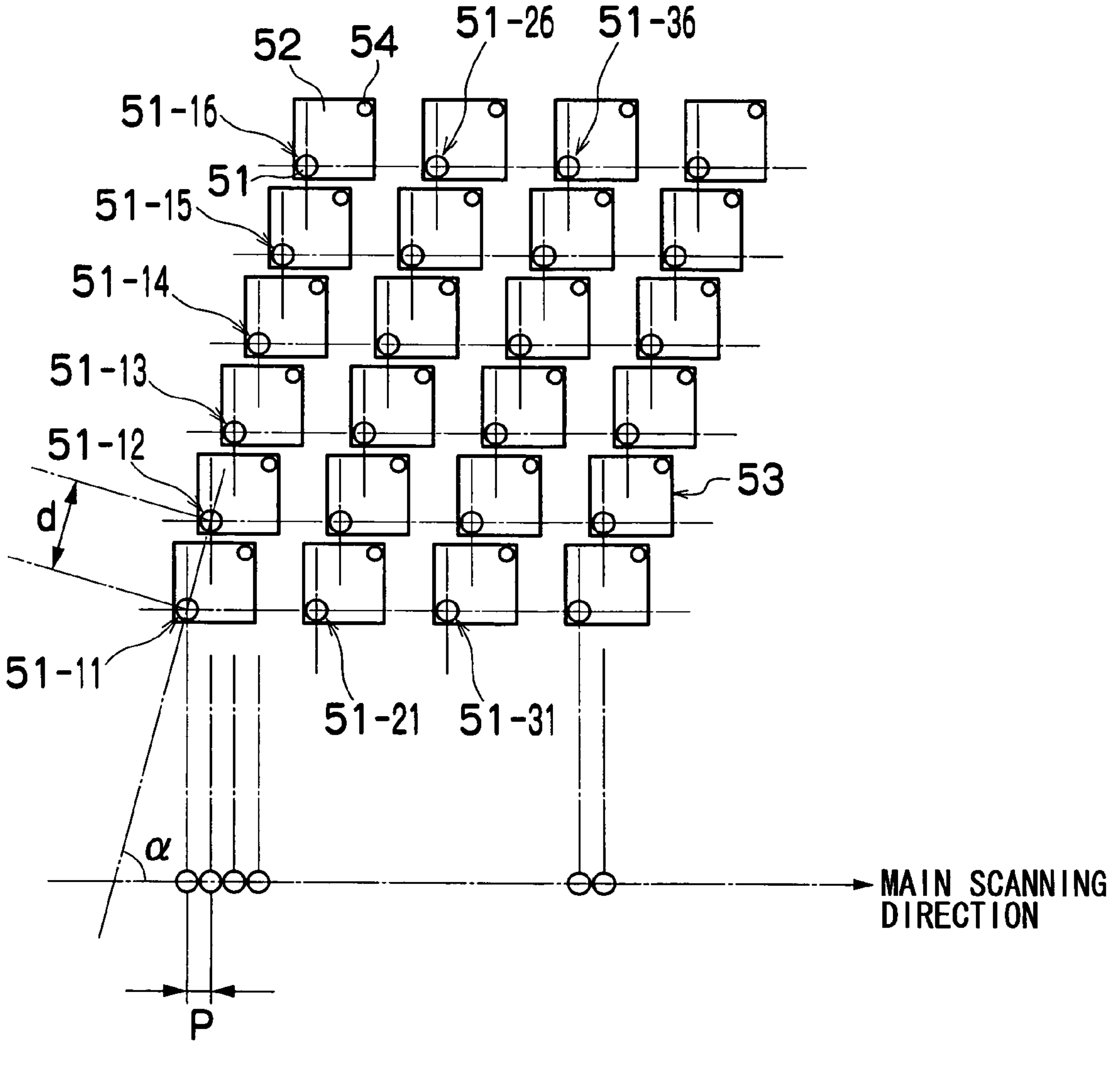
FIG. 5 is an enlarged view showing a nozzle arrangement in the print head shown in FIGS. 2A and 2B.

By arranging a plurality of ink chamber units 53 having this structure in a lattice configuration based on a fixed arrangement pattern having a row direction aligned with the main scanning direction and an oblique column direction having a uniform non-perpendicular angle of $\alpha$ with respect to the main scanning direction, as shown in FIG. 5, the effective distance between the nozzles when projected to an alignment in the main scanning direction (a direction perpendicular to the recording medium conveyance direction), in other words, the projected nozzle pitch, is reduced, and high density arrangement of the nozzles can be achieved.

More specifically, by adopting a structure in which a plurality of ink chamber units 53 are arranged at a uniform pitch d in line with a direction forming an angle of $\alpha$ with respect to the main scanning direction, the pitch P of the nozzles projected so as to align in the main scanning direction is $d \times \cos\alpha$, and hence the nozzles 51 can be regarded to be equivalent to those arranged linearly at a fixed pitch P along the main scanning direction. Such configuration results in a nozzle row in high density.

In a full-line head comprising rows of nozzles that have a length corresponding to the entire width of the image recordable width, the "main scanning" is defined as printing one line (a line formed of a row of dots, or a line formed of a plurality of rows of dots) in the width direction of the recording paper (the direction perpendicular to the conveyance direction of the recording paper) by driving the nozzles in one of the following ways: (1) simultaneously driving all the nozzles; (2) sequentially driving the nozzles from one side toward the other; and (3) dividing the nozzles into blocks and sequentially driving the nozzles from one side toward the other in each of the blocks.

In particular, when the nozzles 51 arranged in a matrix such as that shown in FIG. 5 are driven, the main scanning according to the above-described (3) is preferred. More specifically, the nozzles 51-11, 51-12, 51-13, 51-14, 51-15 and 51-16 are treated as a block (additionally; the nozzles 51-21, . . . , 51-26 are treated as another block; the nozzles 51-31, . . . , 51-36 are treated as another block; . . . ); and one line is printed in the width direction of the recording paper 16 by sequentially driving the nozzles 51-11, 51-12, . . . , 51-16 in accordance with the conveyance velocity of the recording paper 16.

On the other hand, "sub-scanning" is defined as to repeatedly perform printing of one line (a line formed of a row of dots, or a line formed of a plurality of rows of dots) formed by the main scanning, while moving the full-line head and the recording medium (paper) relatively to each other.

The direction indicated by one line (or the lengthwise direction of a band-shaped region) recorded by main scanning as described above is called the "main scanning direction", and the direction in which sub-scanning is performed, is called the "sub-scanning direction". In other words, in the present embodiment, the conveyance direction of the recording paper 16 is called the sub-scanning direction and the direction perpendicular to same is called the main scanning direction.

In implementing the present invention, the arrangement of the nozzles is not limited to that of the example illustrated.

Moreover, a method is employed in the present embodiment where an ink droplet is ejected by means of the deformation of the actuator 58, which is typically a piezoelectric element; however, in implementing the present invention, the method used for ejecting ink is not limited in particular, and instead of the piezo jet method, it is also possible to apply various types of methods, such as a thermal jet method where the ink is heated and bubbles are caused to form therein by means of a heat generating body such as a heater, ink droplets being ejected by means of the pressure applied by these bubbles.

Configuration of Ink Supply System

Figure 6:
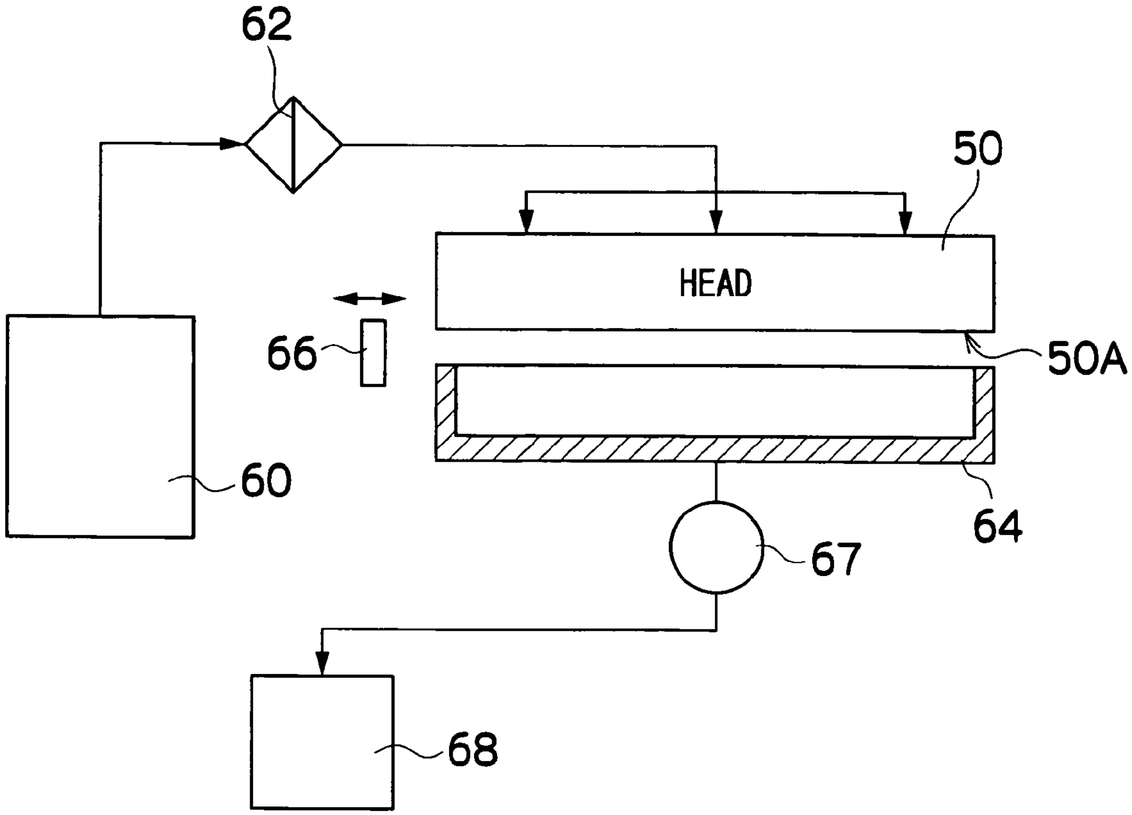
FIG. 6 is a schematic drawing showing the composition of an ink supply system in the inkjet recording apparatus according to the present embodiment.

FIG. 6 is a schematic drawing showing the configuration of the ink supply system in the inkjet recording apparatus 10. The ink tank 60 is a base tank that supplies ink to the head 50 and is set in the ink storing and loading unit 14 described with reference to FIG. 1. The aspects of the ink tank 60 include a refillable type and a cartridge type: when the remaining amount of ink is low, the ink tank 60 of the refillable type is filled with ink through a filling port (not shown) and the ink tank 60 of the cartridge type is replaced with a new one. In order to change the ink type in accordance with the intended application, the cartridge type is suitable, and it is preferable to represent the ink type information with a bar code or the like on the cartridge, and to perform ejection control in accordance with the ink type. The ink tank 60 in FIG. 6 is equivalent to the ink storing and loading unit 14 in FIG. 1 described above.

A filter 62 for removing foreign matters and bubbles is disposed between the ink tank 60 and the head 50 as shown in FIG. 6. The filter mesh size in the filter 62 is preferably equivalent to or less than the diameter of the nozzle and commonly about 20 μm. Although not shown in FIG. 6, it is preferable to provide a sub-tank integrally to the print head 50 or nearby the head 50. The sub-tank has a damper function for preventing variation in the internal pressure of the head and a function for improving refilling of the print head.

The inkjet recording apparatus 10 is also provided with a cap 64 as a device to prevent the nozzles 51 from drying out or to prevent an increase in the ink viscosity in the vicinity of the nozzles 51, and a cleaning blade 66 as a device to clean the nozzle face 50A. A maintenance unit (restoring device) including the cap 64 and the cleaning blade 66 can be relatively moved with respect to the head 50 by a movement mechanism (not shown), and is moved from a predetermined holding position to a maintenance position below the head 50 as required.

The cap 64 is displaced up and down relatively with respect to the head 50 by an elevator mechanism (not shown). When the power of the inkjet recording apparatus 10 is turned OFF or when in a print standby state, the cap 64 is raised to a predetermined elevated position so as to come into close contact with the head 50, and the nozzle face 50A is thereby covered with the cap 64.

The cleaning blade 66 is composed of rubber or another elastic member, and can slide on the nozzle surface 50A (surface of the nozzle plate) of the head 50 by means of a blade movement mechanism (not shown). When ink droplets or foreign matter has adhered to the surface of the nozzle plate, the surface of the nozzle plate is wiped by sliding the cleaning blade 66 on the nozzle plate.

During printing or standby, when the frequency of use of specific nozzles is reduced and ink viscosity increases in the vicinity of the nozzles, a preliminary discharge is made to eject the degraded ink toward the cap 64 (serving also as an ink receiver).

When a state in which ink is not ejected from the head 50 continues for a certain amount of time or longer, the ink solvent in the vicinity of the nozzles 51 evaporates and ink viscosity increases. In such a state, ink can no longer be ejected from the nozzle 51 even if the actuator 58 for the ejection driving is operated. Before reaching such a state (in a viscosity range that allows ejection by the operation of the actuator 58) the actuator 58 is operated to perform the preliminary discharge to eject the ink whose viscosity has increased in the vicinity of the nozzle toward the ink receptor. After the nozzle surface is cleaned by a wiper such as the cleaning blade 66 provided as the cleaning device for the nozzle face 50A, a preliminary discharge is also carried out in order to prevent the foreign matter from becoming mixed inside the nozzles 51 by the wiper sliding operation. The preliminary discharge is also referred to as "dummy discharge", "purge", "liquid discharge", and so on.

On the other hand, if air bubbles become intermixed into the nozzle 51 or pressure chamber 52, or if the rise in the viscosity of the ink inside the nozzle 51 exceeds a certain level, then it may not be possible to eject ink in the preliminary ejection operation described above. In cases of this kind, a cap 64 forming a suction device is pressed against the nozzle surface 50A of the print head 50, and the ink inside the pressure chambers 52 (namely, the ink containing air bubbles of the ink of increased viscosity) is suctioned by a suction pump 67. The ink suctioned and removed by means of this suction operation is sent to a collection tank 68. The ink collected in the collection tank 68 may be reused, or if reuse is not possible, it may be discarded.

Since the suctioning operation is performed with respect to all of the ink in the pressure chambers 52, it consumes a large amount of ink, and therefore, desirably, preliminary ejection is carried out while the increase in the viscosity of the ink is still minor. The suction operation is also carried out when ink is loaded into the print head 50 for the first time, and when the head starts to be used after being idle for a long period of time.

Description of Control System

Figure 7:
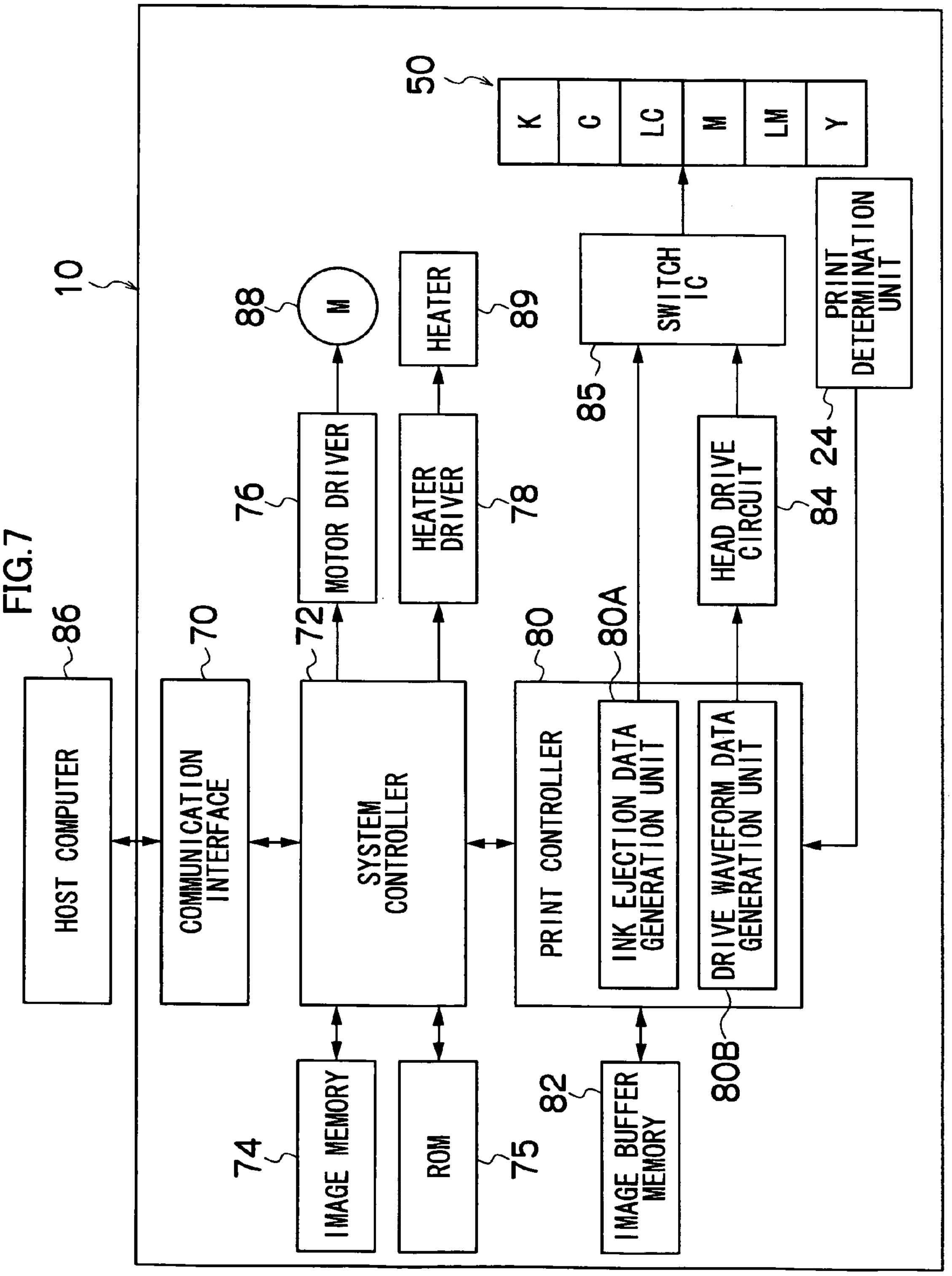
FIG. 7 is a principal block diagram showing the system composition of an inkjet recording apparatus according to the present embodiment.

FIG. 7 is a principal block diagram showing the system configuration of the inkjet recording apparatus 10. The inkjet recording apparatus 10 comprises a communication interface 70, a system controller 72, an image memory 74, a ROM 75, a motor driver 76, a heater driver 78, a print controller 80, an image buffer memory 82, a head drive circuit 84, switch IC 85 and the like.

The communication interface 70 is an interface unit (image input unit) which functions as an image input device for receiving image data transmitted by a host computer 86. A serial interface such as USB, IEEE1394, Ethernet, wireless network, or a parallel interface such as a Centronics interface may be used as the communication interface 70. A buffer memory (not shown) may be mounted in this portion in order to increase the communication speed.

The image data sent from the host computer 86 is received by the inkjet recording apparatus 10 through the communication interface 70, and is temporarily stored in the image memory 74. The image memory 74 is a storage device for temporarily storing images inputted through the communication interface 70, and data is written and read to and from the image memory 74 through the system controller 72. The image memory 74 is not limited to a memory composed of semiconductor elements, and a hard disk drive or another magnetic medium may be used.

The system controller 72 includes a central processing unit (CPU) and peripheral circuits thereof, and the like, and the system controller 72 functions as a control device for controlling the whole of the inkjet recording apparatus 10 in accordance with a prescribed program, as well as a calculation device for performing various calculations. More specifically, the system controller 72 controls the various sections, such as the communication interface 70, image memory 74, motor driver 76, heater driver 78, and the like, as well as controlling communications with the host computer 86 and writing and reading to and from the image memory 74 and ROM 75, and it also generates control signals for controlling the motor 88 and heater 89 of the conveyance system.

The program executed by the CPU of the system controller 72 and the various types of data (including data for printing a test pattern) which are required for control procedures are stored in the ROM 75. The ROM 75 may be a non-writeable storage device, or it may be a rewriteable storage device, such as an EEPROM. The image memory 74 is used as a temporary storage region for the image data, and it is also used as a program development region and a calculation work region for the CPU.

The motor driver (drive circuit) 76 drives the motor 88 of the conveyance system in accordance with commands from the system controller 72. The heater driver (drive circuit) 78 drives the heater 89 of the post-drying unit 42 or the like in accordance with commands from the system controller 72.

The print controller 80 includes an ink ejection data generation unit 80A for generating ink ejection data for the heads 50 of the respective colors, and a drive waveform data generation unit 80B for generating drive waveform data for the heads 50 (namely, the waveform of the drive signal applied to the actuators 58), on the basis of the inputted image, and the print controller 80 functions as an ejection control device which outputs an ejection drive control signal in accordance with the control implemented by the system controller 72.

An image buffer memory 82 is provided in the print controller 80, and image data, parameters, and other data are temporarily stored in the image buffer memory 82 when image data is processed in the print controller 80. FIG. 7 shows a mode in which the image buffer memory 82 is attached to the print controller 80; however, the image memory 74 may also serve as the image buffer memory 82. Also possible is a mode in which the print controller 80 and the system controller 72 are integrated to form a single processor.

The ink ejection data generation unit 80A is a signal processing device which carries out processing, such as waveform shaping, correction and the like, in order to generate an ink ejection (droplet ejection) control signal from the inputted image data (multiple-value inputted image data) read into the image memory 74. As well as generating dot data for the inks of the respective colors, the ink ejection data generation unit 80A generates ejection data (droplet ejection data) for the nozzles corresponding to the respective dots, from the aforementioned dot data. The ink ejection data thus generated by the ink ejection data generation unit 80A is used to control the switch IC 85.

The detailed composition of the head drive circuit 84 is not illustrated here, but the head drive circuit 84 is constituted by a D/A converter (DAC) which converts the digital waveform data of the ejection drive waveform outputted from the drive waveform data generation unit 80B into an analog waveform signal, an amplifier circuit which amplifies the analog waveform signal, a charging and discharging circuit, and a push-pull circuit. In other words, the digital waveform data of the ejection drive waveform outputted from the drive waveform data generation unit 80B is converted into an analog waveform signal corresponding to the inputted waveform data, in the head drive circuit 84. This analog waveform signal is amplified to a prescribed level by the amplifier circuit, the power of the signal is amplified by the push-pull circuit, and the signal is then outputted as a drive signal waveform. The drive signal waveform thus generated is inputted to the switch IC 85.

The switch IC 85 includes a shift register, a latch circuit, a level conversion circuit and switching element array, and the switch IC 85 functions as a circuit (multiplexer) that selectively switches the connection relationships between the various actuators 58 in the head 50 and the head drive circuit 85, on the basis of control signals supplied by the print controller 80 (namely, ink ejection data, "enable" signal, "select" signal, and so on). More specifically, a signal for driving the respective actuators 58 of the head 50 (drive signal waveform) is outputted from the head drive circuit 84 and is applied selectively to the respective actuators 58, through the power supply line, and the switching elements of the switch IC 85.

The switch IC 85 functions as a selection circuit for selectively applying the drive waveform from the head drive circuit 84, to the respective actuators 58 of the head 50, on the basis of the control signal supplied from the print controller 80. The combination of the drive waveform data generation unit 80B and the head drive circuit 84 in the drawings corresponds to the "drive signal application device".

To give a general description of the sequence of processing from image input to print output, image data to be printed (original image data) is inputted from an external source through the communication interface 70, and is accumulated in the image memory 74. At this stage, RGB image data is stored in the image memory 74, for example.

In this inkjet recording apparatus 10, an image which appears to have a continuous tonal graduation to the human eye is formed by changing the droplet ejection density and the dot size of fine dots created by ink (coloring material), and therefore, it is necessary to convert the inputted digital image into a dot pattern which reproduces the tonal graduations of the image (namely, the light and shade toning of the image) as faithfully as possible. Therefore, original image data (RGB data) stored in the image memory 74 is sent to the print controller 80 through the system controller 72, and is converted to the dot data for each ink color by a half-toning technique, using dithering, error diffusion, or the like, in the print controller 80.

In other words, the print controller 80 carries out processing for converting the colors of the inputted RGB image data into the four colors of K, C, M and Y, as well as processing for distribution between the dark and light inks, thereby generating dot data for the separate ink colors (in this case, six inks). The dot data for the respective colors generated by the print controller 80 in this way is then converted to droplet ejection data for ejecting ink from the nozzles of the heads 50, thus establishing ink ejection data corresponding to the dot that are to be printed.

The on and off switching of the switch element in the switch IC 85 is controlled on the basis of this ink ejection data. When the switching element selected on the basis of the ink ejection data is switched on, then a drive signal is applied to the corresponding actuator 58, through this switching element, and ink is ejected from the nozzle of the pressure chamber 52 on which that actuator 58 acts. By controlling ink ejection from the print heads 50 in synchronization with the conveyance speed of the recording paper 16, an image is formed on the recording paper 16. A feedback control system for maintaining uniform driving conditions in the head may also be incorporated into the head drive circuit 85.

As described above, the ejection volume and the ejection timing of the droplets from the head 50 are controlled, on the basis of the dot data (ink ejection data) generated by implementing prescribed signal processing in the print controller 80. By this means, prescribed dot size and dot positions can be achieved.

As shown in FIG. 1, the print determination unit 24 is a block including an image sensor, which reads in the image printed onto the recording medium 16, performs various signal processing operations, and the like, and determines the print situation (presence/absence of ejection, variation in droplet ejection, optical density, and the like), these determination results being supplied to the print controller 80.

According to requirements, the print controller 80 makes various corrections with respect to the head 50 on the basis of information obtained from the print determination unit 24. Furthermore, the system controller 72 implements control for carrying out preliminary ejection, suctioning, and other prescribed restoring processes, as and when necessary, on the basis of the information obtained from the print determination unit 24.

Ink Characteristics

Next, the characteristics of the ink used in the inkjet recording apparatus 10 according to the present embodiment are described. In the inkjet recording apparatus 10 according to the present embodiment, the dark inks and light inks have different liquid characteristics (properties) and different dot diameters are achieved in accordance with these different characteristics.

More specifically, the inkjet recording apparatus 10 according to the present embodiment drives ejection for dark inks and light inks by means of the same drive waveform, without independently changing the ejection volume (droplet volume per dot) for the dark inks and the light inks. By applying the same drive waveform, the ejection volume of the dark inks and the ejection volume of the light inks are substantially the same. More specifically, while there is a possibility that the ejection volume may vary due to the range of fluctuation of the pressure chambers 52 and the actuators 58, the droplet ejection volume (droplet volume for one dot) is generally the same for the dark inks and the light inks, from the viewpoint that the ejection volume is not altered intentionally (no adjustment is performed to eject droplets of different sizes for large dots and small dots).

However, due to the difference in ink characteristics between the dark inks and light inks, as described below, the diameters of the dots formed by the ink droplets deposited on the recording medium (recording paper 16) vary, due to the difference between the characteristics of the two liquids. The dot diameter created by the dark ink is relatively large, and the dot diameter created by the light ink is relatively small. For example, when an ink droplet of 2 picoliters (pl) is deposited on standard recording paper, then a dark ink forms a dot of 35 μm to 40 μm in diameter, and a light ink forms a dot of 25 μm to 30 μm in diameter.

Below, examples of the characteristics of the dark inks and the light inks used in the present embodiment are described in respect of the density of coloring material, the surface tension, the viscosity, and the angle of contact when it makes contact with the recording medium.

Coloring Material Density

The density of coloring material in the dark ink is taken to be not less than 6 wt % (and not more than 20 wt %), and the density of coloring material in the light ink is taken to be ¼ to ⅙ of the coloring material density in the dark ink. If the mass ratio is described in numerical terms, then the coloring material density of the light ink is taken to be 1 wt % to 5 wt %. Since the coloring material density of the usual standard ink (dark ink) is approximately 5 wt %, then the dark ink used in the present embodiment employs an ink having a higher density of coloring material than this.

This is in order to ensure the required recording density, even if a dot of a relatively large dot diameter is formed by a dark ink, and hence the density of the coloring material in the dark ink is set to a greater density than in the related art, in order that the prescribed recording density is obtained by means of a small deposition volume.

Surface Tension

The surface tension of the light ink is taken to be greater than the surface tension of the dark ink. For example, the surface tension $\gamma_1$ of the light ink is 30 mN/m to 40 mN/m, and the surface tension $\gamma_2$ of the dark ink is 20 mN/m to 30 mN/m. The method of adjusting the surface tension may involve a mode in which the amount of surfactant added to the ink solvent is adjusted, a mode in which the type of surfactant is varied, or a mode combining these.

To describe one example of varying the surface tension by means of the added amount of surfactant, by using "Olefin E1010 (product name)" manufactured by Nisshin Kagaku Kogyo K.K., as a surfactant, and reducing the added amount of this surfactant (for example, to 0.5 wt %), the surface tension is increased, while by increasing the added amount of the surfactant (for example, to 2.0 wt %), the surface tension is reduced. The added amount of surfactant is adjusted in such a manner that the dark ink and the light ink respectively assume prescribed surface tensions.

Furthermore, to describe an example in which the surface tension is altered by changing the type of surfactant used, there is a mode in which either "Olfine E1010 (product name)" manufactured by Nissin Chemical Industry Co., Ltd., or "Unidyne (product name)" manufactured by Daikin Industries, Ltd. is used as a surfactant. When the same amount of surfactant is selectively added, the surface tension is higher in an ink to which "Olfine E1010" is added, and the surface tension is lower in an ink to which "Unidyne" is added. The type of surfactant is selected and prepared in such a manner that the dark ink and the light ink respectively assume prescribed surface tensions.

Ink Viscosity

The viscosity of the light ink is taken to be greater than the viscosity of the dark ink. For example, the viscosity $\eta_1$ of the light ink and the viscosity $\eta_2$ of the dark ink are generally 1 mPa·s to 20 mPa·s, and the viscosities are adjusted within this range (1 mPa·s to 20 mPa·s) by means of the added amount of glycerol, or the like, in such a manner that the viscosity $\eta_1$ of the light ink is greater than the viscosity $\eta_2$ of the dark ink.

Angle of Contact

The angle of contact of the light ink with respect to the recording medium (recording paper 16) is taken to be greater than the angle of contact of the dark ink with respect to the recording medium. For example, the angle of contact $\theta_1$ of the light ink with respect to recording paper of a commonly used type is taken to be 30 degrees to 80 degrees, and the angle of contact $\theta_2$ of the dark ink with respect to the same recording paper is taken to be 10 degrees to 30 degrees. Since there is a correlation between the surface tension and the angle of contact, then it is possible to control the angle of contact by adjusting the surface tension.

By satisfying the conditions of the ink characteristics in respect of at least one of the surface tension, viscosity and angle of contact as described above, then it is possible to make the diameter of the recorded dots of the dark ink relatively larger, and to make the diameter of the recorded dots of the light ink relatively smaller, under the same ejection drive conditions (the same drive waveform).

Description of Recording Method

Next, the operation of the inkjet recording apparatus having the foregoing composition is described.

Figure 8:
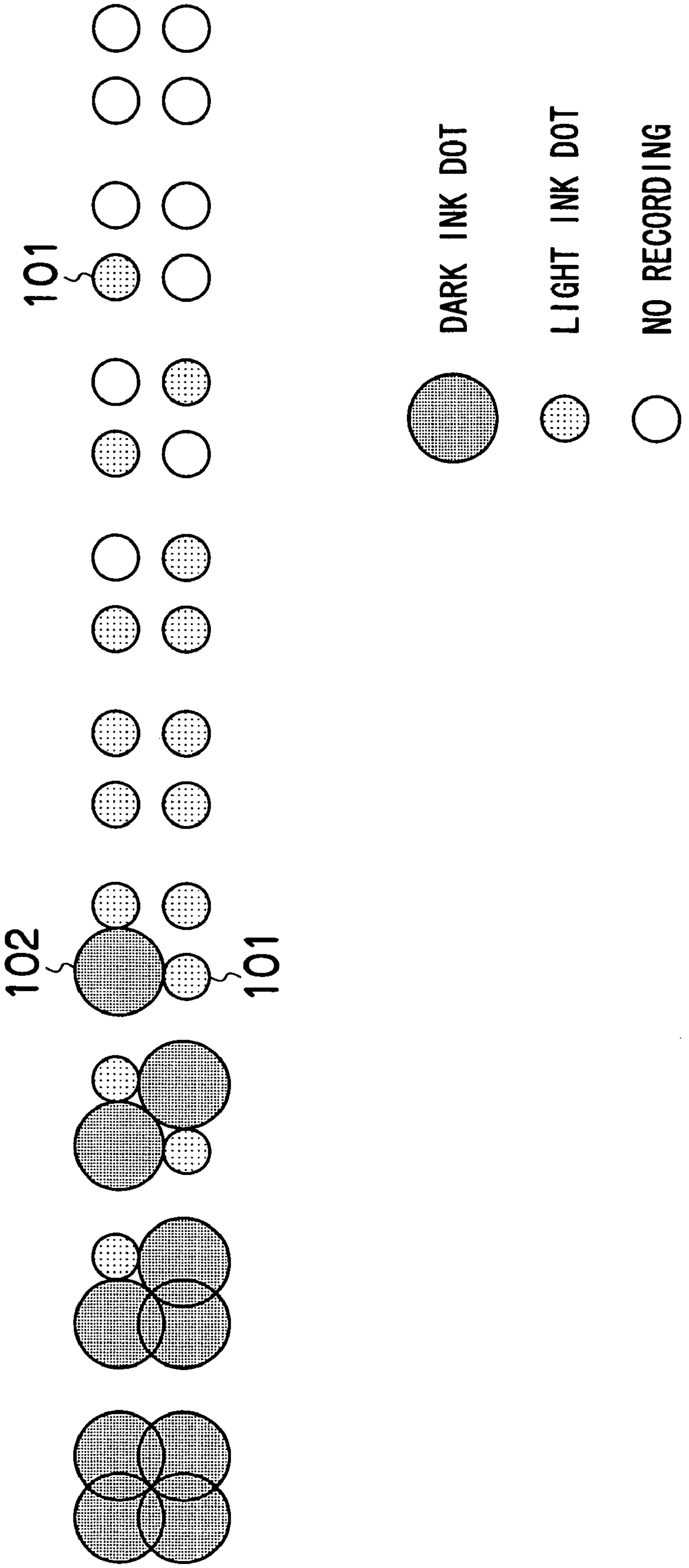
FIG. 8 is a diagram showing an embodiment of tonal recording according to the present embodiment.

FIG. 8 is a diagram showing a schematic view of an example in which tonal graduations are recorded by using inks of two types, namely, dark and light inks, of the same color type. FIG. 8 shows an example in which nine stages of tones (0 to 8 tones) are recorded by means of a combination of dots of dark ink and dots of light ink, in a 2 (row)×2 (column) pixel region (dot matrix). In order to simplify the illustration, the differences between the dot sizes and the dot intervals are depicted in an exaggerated fashion, in order to aid understanding of the differences between the dot diameters of the dark ink dots and the light ink dots.

As shown in FIG. 8, in the low-density regions of the printed image (tonal graduations 1 to 4), the light ink only is used, and light ink dots 101 are recorded on the base surface (white surface) of the recording medium. In this case, since the dot diameter of the light ink dots 101 (which corresponds to the first dot diameter) is small, then the visibility of the dots is reduced and the effect of granularity is lowered.

In the medium-density regions (tonal graduations 5 to 7), recording is performed by using a combination of the light ink dots 101 and dark ink dots 102. In the junction regions between the low-density and medium-density regions, observing the granularity effect of the dark ink dot 102 created when a droplet is deposited to form the dark ink dot 102 of a relatively large surface area using dark ink of high coloring material density, instead of the light ink dots 101 having the small dot diameter, the light ink dots 101 are deposited about the periphery of the dark ink dot 102, and therefore, the peripheral density of the dark ink dot 102 is increased by the light ink dots 101. Since the most important factor in dot granularity is the visibility of isolated dots scattered independently on the white base surface, then the effect of granularity of dark ink dots is reduced by depositing droplets to form dark ink dots 102 in combination with light ink dots 101 (in other words, by combining deposition of dark and light ink dots).

Furthermore, when recording the maximum density which can be outputted by the present apparatus (density Dmax, or tonal graduation 8 in FIG. 8), the dark ink only is used. By suitably increasing the density of the coloring material in the dark ink (to 6 wt % or above and 20 wt % or below), it becomes possible to achieve a density value that is satisfactory in quality terms, by means of droplets ejected to create the minimum necessary overlap required to prevent the white base surface from being visible. Furthermore, increasing the dot diameter (corresponding to the second dot diameter) means that the number of droplets that need to be deposited per unit surface area is reduced. In other words, by using an ink having a high density of coloring material and increasing the dot diameter, it is possible to reduce the amount of ink deposited at Dmax, in comparison with the related art. Therefore, the occurrence of cockling can be suppressed, as well as increasing the efficiency of the drying and fixing processes carried out after printing.

Further Embodiments

Figure 9:
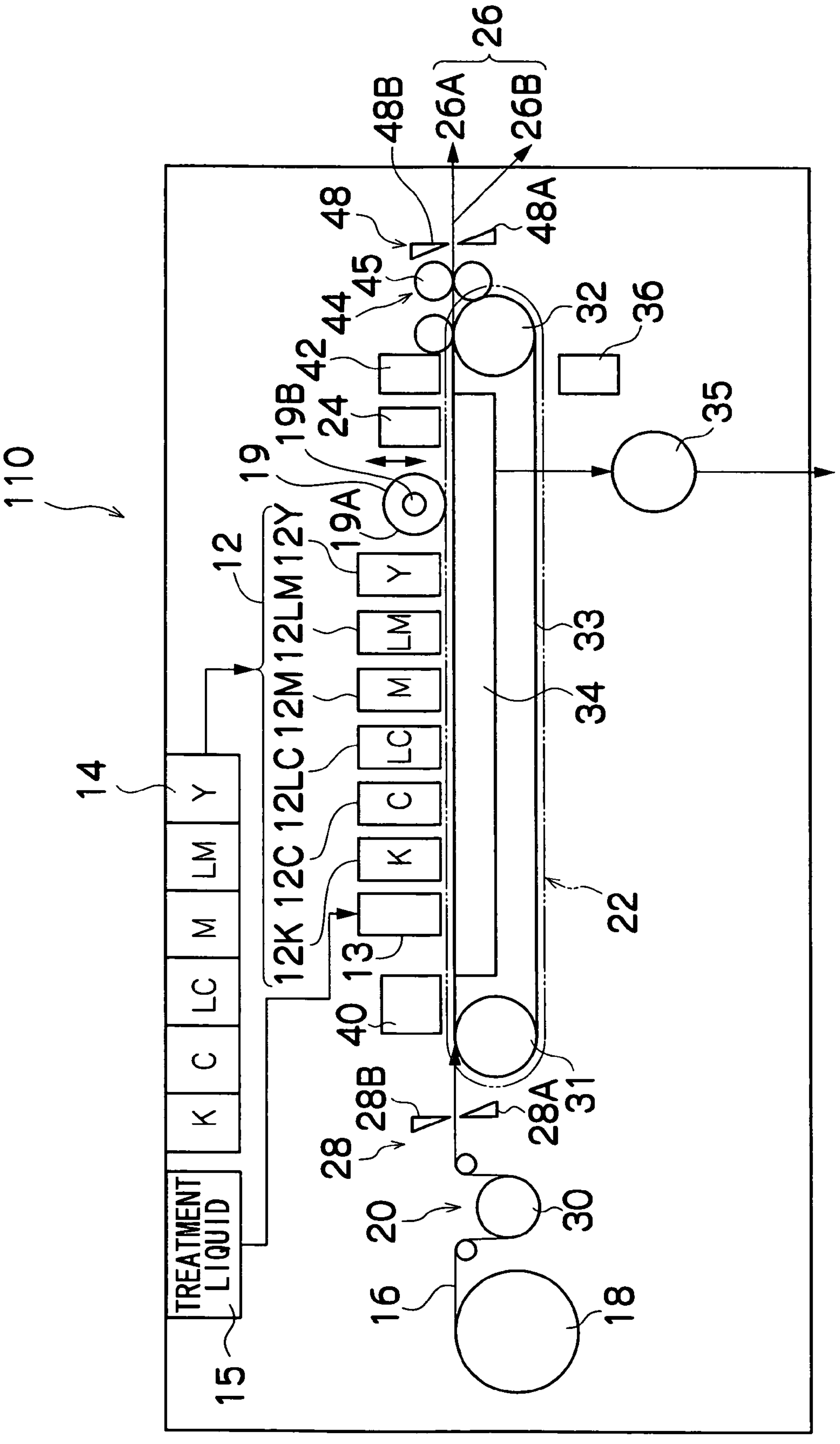
FIG. 9 is a general schematic drawing of an inkjet recording apparatus according to a further embodiment of the present invention.

FIG. 9 is a diagram of the general composition of an inkjet recording apparatus according to a further embodiment of the present invention. In FIG. 9, elements which are the same as or similar to the composition shown in FIG. 1 are denoted with the same reference numerals and description thereof is omitted here.

The inkjet recording apparatus 110 shown in FIG. 9 includes an ejection head (hereinafter, called "treatment liquid head") 13 forming a treatment liquid deposition device, on the furthest upstream side of the print unit 12, and treatment liquid is deposited in advance onto the print surface of the recording paper 16 by the preceding (upstream) treatment liquid head 13, before ejection of ink droplets by the ink ejection heads 12K, 12C, 12LC, 12M, 12LM and 12Y. Furthermore, a solvent absorbing roller 19 forming a device for absorbing and removing ink solvent from the recording paper 16 is provided in the last stage (downstream side) of the print unit 12.

Although not shown in the drawings, the structure of the treatment liquid head 13 is approximately the same as the structure of the ink ejection head 50 shown in FIGS. 2A to 5. It is not necessary to form treatment liquid dots to a high density, in comparison with the ink, as long as the treatment liquid is deposited on the recording paper 16 in a substantially uniform (even) fashion in the region where ink droplets are to be ejected. Consequently, the treatment liquid head 13 shown in FIG. 9 may be composed with a reduced number of nozzles (a reduced nozzle density) in comparison with the print heads 50 for ejecting ink. Furthermore, a composition may also be adopted in which the nozzle diameter of the treatment liquid head 13 is greater than the nozzle diameter of the print head 50 for ejecting ink.

The treatment liquid storing and loading unit 15 has a treatment liquid tank for storing treatment liquid, and the tank is connected to the treatment liquid head 13 through necessary tubing channels. The treatment liquid supplied from the treatment liquid tank is ejected in the form of droplets from the treatment liquid head 13. The treatment liquid storing and loading unit 15 has a reporting device (display device, alarm sound generating device) for issuing a report when the remaining amount of treatment liquid has become low. The ink used in this inkjet recording apparatus 110 is, for instance, colored ink including anionic polymer, namely, a polymer containing negatively charged surface-active ions. Furthermore, the treatment liquid is, for instance, a transparent reaction promotion agent including cationic polymer, namely, a polymer containing positively charged surface-active ions.

When ink and treatment liquid are mixed, an insolubilization and/or fixing reaction of the coloring material in the ink proceeds due to a chemical reaction. Here, the term "insolubilization" includes a phenomenon whereby the coloring material separates or precipitates from the solvent, a phenomenon whereby the liquid in which the coloring material is dissolved changes (coagulates) to a solid phase, or a phenomenon whereby the liquid increases in viscosity and hardens. Furthermore, the term "fixing" may indicate a mode where the coloring material is held on the surface of the recording paper 16, a mode where the coloring material permeates into the recording paper 16 and is held therein, or a mode combining these states.

The reaction speed and the characteristics of the respective liquids (surface tension, viscosity, or the like) can be adjusted by regulating the respective compositions of the ink and treatment liquids, the concentration of the materials contributing to the reaction, or the like, and desired ink insolubility and/or ink fixing properties (hardening speed, fixing speed, or the like) can be achieved.

To give concrete examples, the treatment liquid used in the present embodiment may include water as a solvent, and a surfactant, moisturizer, cationic polymer, and coloring material aggregating agent (for example, a pH adjuster or multivalent metallic salt).

Furthermore, the ink used in the present embodiment is constituted by water as a solvent, and a coloring material (pigment or dye), surfactant, and moisturizer. It is also possible to include an anionic polymer. In general, the coloring material (pigment or dye) yields negative ions (anions) in a solvent (water), and therefore, the pigment or dye itself has reactive properties which cause itself to react with the cationic polymer in the treatment liquid.

As examples of the cationic polymer material included in the treatment liquid, it is possible to use polyarylamine, polyamine sulfone, polyvinylamine, chitosan, or neutralized products of these acids.

As a material for the pH adjuster, it is possible to use an acid containing an inorganic acid (hydrochloric acid, sulfuric acid, phosphoric acid, or the like) or an organic acid (desirably, an acid containing carboxylic acid, sulfonic acid, or the like, and more specifically, acetic acid, methanesulfonic acid, or the like).

As the multivalent metallic salt, it is possible to use various salts of multivalent metallic ions, such as aluminum, calcium, magnesium, iron, zinc, tin, and the like.

Furthermore, as an example of the anionic polymer material added to the ink according to requirements, it is possible to use a polyacrylic acid, shellac, styrene-acrylate copolymer, styrene-maleic anhydride copolymer, or the like.

The conditions of the ink properties of the dark inks and light inks used in the inkjet recording apparatus 110 of the present embodiment, which is based on the combination of two liquids to cause a reaction between the treatment liquid and the ink, are as stated previously. However, since the ink droplets are deposited onto the treatment liquid, then the conditions relating to the angle of contact of the ink on the treatment liquid are as described below.

In other words, the angle of contact of the light ink with respect to the treatment liquid is set to be greater than the angle of contact of the dark ink with respect to the same treatment liquid. By using light inks and dark inks which satisfy these conditions, it is possible to make the diameter of the recorded dots of light ink smaller than the diameter of the recorded dots of dark ink. The surface of the solvent absorbing roller 19 is made of a porous member 19A, which has a length corresponding to the maximum width of the recording paper 16 used in the inkjet recording apparatus 110. The rotational axle 19B of the solvent absorbing roller 19 is disposed in a direction (main scanning direction) perpendicular to the conveyance direction of the recording paper 16.

The solvent absorbing roller 19 may achieve a length corresponding to the full width of the recording paper 16 by means of one (a single) long roller member, and it may also achieve the required length by aligning a plurality of roller modules divided in a direction (main scanning direction) substantially perpendicular to the conveyance direction of the recording paper 16. Furthermore, it is possible to adopt a composition in which a plurality of rows of solvent absorbing rollers are disposed in line with the conveyance direction of the recording paper 16.

Although not shown in FIG. 9, an elevator mechanism is provided for raising and lowering the solvent absorbing roller 19 with respect to the recording surface of the recording paper 16, thereby adjusting the vertical position of the solvent absorbing roller 19 (the contact pressure against the recording paper 16 or the amount of clearance with respect to the recording paper 16).

By moving the recording paper 16 in the direction of conveyance, while making the solvent absorbing roller 19 contact the ink on the recording paper 16, the solvent on the recording paper 16 (the solvent separated from the coloring material) is absorbed by the solvent absorbing roller 19 due to the capillary force of the porous member 19A. The solvent absorbing roller 19 supported rotatably about the rotational axle 19B can be rotated in concordance with the conveyance speed of the recording paper 16, in such a manner that the relative speed with respect to the recording paper 16 becomes zero, and hence disturbance of the image due to rubbing of the ink is prevented. In the ink from which the excess solvent has been removed by the solvent absorbing roller 19 in this way, the coupling force between the coloring material increases, and the coloring material becomes fixed onto the recording paper 16.

Figure 10:
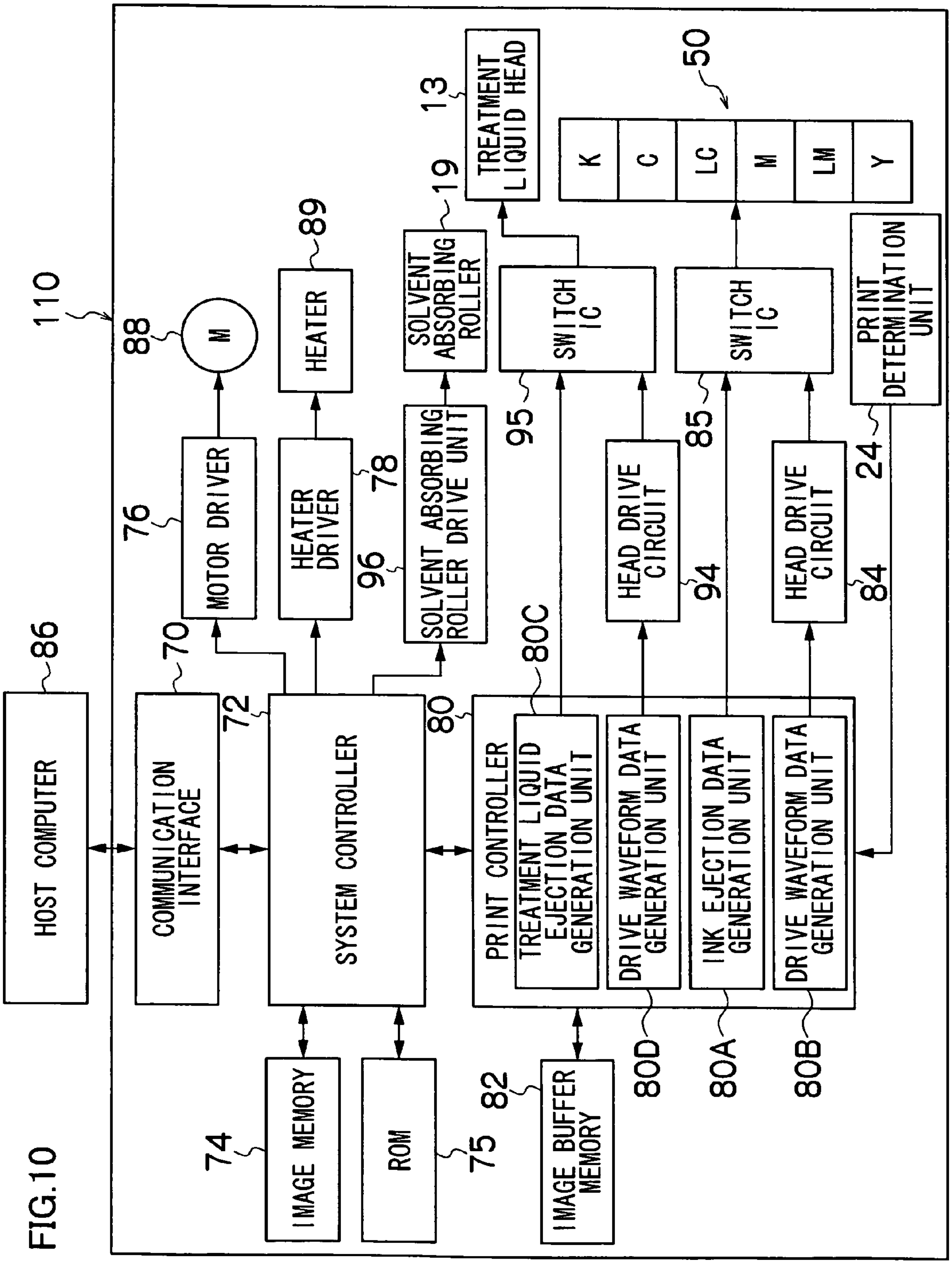
FIG. 10 is a principal block diagram showing the system configuration of the inkjet recording apparatus shown in FIG. 9.

FIG. 10 is a principal block diagram showing the system composition of the inkjet recording apparatus 110 shown in FIG. 9. In FIG. 10, elements which are the same as or similar to the composition shown in FIG. 7 are denoted with the same reference numerals and description thereof is omitted here.

As shown in FIG. 10, the print controller 80 of the inkjet recording apparatus 110 according to the present embodiment comprises a treatment liquid ejection data generation unit 80C which generates ejection data for the treatment liquid head 13 on the basis of the inputted image, and a drive waveform data generation unit 80D which generates drive waveform data for the treatment liquid head 13. The print controller 80 thus functions as an ejection control device which outputs controls signals for driving ejection of treatment liquid in accordance with the control of the system controller 72.

The treatment liquid ejection data generation unit 80C is a signal processing device which performs various processes and corrections for generating signals for treatment liquid ejection (droplet ejection), from the inputted image data (multiple-value inputted image data) read into the image memory 74. The treatment liquid ejection data generation unit 80C carries out processing for generating dot data for the treatment liquid, on the basis of the dot data for the inks of respective colors generated by the ink ejection data generation unit 80A.

The treatment liquid ejection data thus generated by the treatment liquid ejection data generation unit 80C is used to control the switch IC 95.

The composition of the treatment liquid drive waveform data generation unit 80D, the head drive circuit 94 and the switch IC 95 is the same as the composition of the ink drive waveform data generation unit 80B, the head drive circuit 84 and the switch IC 85.

The on and off switching of the switch element in the switch IC 95 is controlled on the basis of the treatment liquid ejection data generated by the treatment liquid ejection data generation unit 80C, whereby droplets of treatment liquid are ejected onto the region of the recording paper 16 corresponding to the ink droplet ejection region.

If the drive waveform of the treatment liquid head 13 is made to differ from the drive waveform of the ink ejection head 50, then as shown in FIG. 10, a composition is adopted in which separate drive waveform data generation units 80B and 80D, and head drive circuits 84 and 94, are provided, but it is also possible to adopt a composition in which the drive waveform of the treatment liquid head 13 and the drive waveform of the ink ejection head 50 are constituted by a common waveform. In this case, a mode is possible in which the drive waveform data generation unit 80D and head drive circuit 94 for the treatment liquid are omitted, and the drive waveform data generation unit 80B and the head drive circuit 84 for the ink are also used for the treatment liquid.

When ink droplets are ejected from the ink ejection head 50 onto the treatment liquid ejected from the treatment liquid head 13, and the treatment liquid and ink mix together on the recording paper 16, a polymer film forms extremely rapidly at the liquid boundary surface, due to a chemical reaction between the cationic polymer in the treatment liquid, and the anionic material in the ink (coloring material having an anionic base, or an anionic polymer added to the ink liquid, or the like) (first reaction). The film formed in this first reaction prevents the unification of mutually adjacent dots and the movement of the ink on the recording medium. Furthermore, as the reaction caused by the coloring material aggregating agent progresses further, either after the first reaction or in parallel with same, then the coloring material aggregates due to the action of the coloring material aggregating agent in the treatment liquid, and an aggregate of the coloring material sinks to the side of the recording paper 16, thereby separating the coloring material from the solvent (second reaction).

In this way, the coloring material aggregate and the solvent separate inside the liquid ink droplets on the recording medium, and the solvent is absorbed by the solvent absorbing roller 19 while in this separated state. In this case, since a film is formed about the periphery of the dots, the coloring material does not move when the solvent is absorbed by means of the solvent absorbing roller 19 making contact with the solvent layer (namely, it is possible to prevent adherence of the coloring material to the solvent absorbing roller 19), and hence no disturbance of the image occurs.

The system controller 72 controls the solvent absorbing roller drive unit 96 in accordance with the thickness and permeation speed characteristics, and the like, of the recording paper 16, thereby suitably controlling the vertical positioning of the solvent absorbing roller 19 (the contact pressure on the recording paper 16 or the clearance with respect to the recording paper 16), and the rotational speed. The solvent absorbing roller drive unit 96 is a device for adjusting the position and rotational speed of the solvent absorbing roller 19 with respect to the recording surface of the recording paper 16, and it comprises an elevator mechanism for moving the solvent absorbing roller 19 upward and downward, a motor (actuator) and driver forming a drive source for moving this mechanism by means of an electric motor, a drive transmission mechanism (belt, pulley or gear, or a suitable combination of same), which transmits the drive force of the motor to the elevator mechanism, a motor and drive forming a drive source for causing the solvent absorbing roller 19 to rotate, and drive transmission mechanism for same, and the like.

By adjusting the position of the solvent absorbing roller 19 (the relative position of the roller in the direction perpendicular to the recording surface of the recording paper 16) under the control of the system controller 72, then it is possible to alter the contact pressure against the recording paper 16, and the clearance between the roller and the recording paper 16. In the case of a composition having a plurality of roller modules, a desirable mode is one in which a mechanism for controlling the vertical position is provided respectively for each roller module.

In this way, according to the inkjet recording apparatus 110 of the present embodiment, by using a reaction between two systems, it is possible to prevent disturbance of the image and to eliminate solvent from the recording medium, swiftly and reliably, at the same time as avoiding landing interference. Moreover, it is also possible to reduce the effect of granularity in the low-density regions, and furthermore the amount of ink ejected at Dmax can be reduced in comparison with the related art, thus facilitating the solvent removal process.

In the inkjet recording apparatus 110 shown in FIGS. 9 and 10, the solvent absorbing roller 19 comprising the porous member 19A is used as a device for absorbing and removing the solvent, but the form of the solvent absorbing device is not limited to being a roller, and it may also be a belt.

In the embodiment described in FIGS. 9 and 10, one treatment liquid ejection head 11 is disposed on the upstream side of the print unit 12 (see FIG. 9), but in implementing the present invention, the mode of arrangement of the treatment liquid head is not limited to this example, and it is also possible to adopt a composition in which a treatment liquid ejection head is appended at at least one position between respective color heads in the print unit 12. Of course, it is also possible to adopt a composition in which treatment liquid heads for ejecting a treatment liquid which reacts with the ink are disposed respectively on the upstream side of (a stage prior to) the respective color heads 12K, 12C, 12LC, 12M, 12LM and 12Y.

Furthermore, in the embodiment shown in FIGS. 9 and 10, an ejection head based on an inkjet method is used as the device for applying treatment liquid, but instead of or in combination with this, it is also possible to use a device which applies treatment liquid to the recording medium by using a contacting member, such as a roller, brush, blade, or the like.

If a composition which deposits the treatment liquid by means of a treatment liquid head (ejection head) is adopted, then it is possible to deposit the treatment liquid selectively onto the required regions of the recording medium (for example, only onto the regions to be printed with ink), on the basis of the image data, and therefore, the amount of treatment liquid consumed can be reduced in comparison with an application device based on a roller, or the like.

On the other hand, a device which applies treatment liquid by using a member such as a treatment liquid application roller has a merit in that it enables handling of a liquid of high viscosity of a level which is difficult to eject by means of an ejection head of the inkjet type, as well as also enabling a large amount of liquid to be deposited in a short period of time.

In the embodiments described above, an inkjet recording apparatus using a page-wide full line type head having a nozzle row of a length corresponding to the entire width of the recording medium is described, but the scope of application of the present invention is not limited to this, and the present invention may also be applied to an inkjet recording apparatus using a shuttle head which performs image recording while moving a short recording head reciprocally.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An inkjet recording apparatus, comprising:

a first ejection device which ejects a droplet of a first ink; and a second ejection device which ejects a droplet of a second ink, the first and second inks being of a same color type, a density of coloring material in the first ink being lower than a density of coloring material in the second ink, wherein, when droplet volume (ejection volume) of the first ink per dot is equal to droplet volume (ejection volume) of the second ink per dot, a diameter of a first dot formed by the droplet ejected from the first ejection device is smaller than a diameter of a second dot formed by the droplet ejected from the second ejection device.

2. The inkjet recording apparatus as defined in claim 1, wherein a surface tension of the first ink is higher than a surface tension of the second ink.

3. The inkjet recording apparatus as defined in claim 1, wherein an angle of contact of the first ink on a recording medium is greater than an angle of contact of the second ink on the recording medium.

4. The inkjet recording apparatus as defined in claim 1, wherein a viscosity of the first ink is greater than a viscosity of the second ink.

5. The inkjet recording apparatus as defined in claim 1, further comprising a treatment liquid deposition device which deposits a treatment liquid onto the recording medium, the treatment liquid insolubilizing the coloring material or preventing dispersion of the coloring material.

6. The inkjet recording apparatus as defined in claim 5, wherein an angle of contact of the first ink with respect to the treatment liquid having been deposited on the recording medium is greater than an angle of contact of the second ink with respect to the treatment liquid having been deposited on the recording medium.

7. The inkjet recording apparatus as defined in claim 2, wherein the diameter of the first dot is made to be smaller than the diameter of the second dot, by differentiating types of surfactant added to the first ink and the second ink.

8. The inkjet recording apparatus as defined in claim 2, wherein the diameter of the first dot is made to be smaller than the diameter of the second dot, by differentiating amounts of surfactant added to the first ink and the second ink.

9. The inkjet recording apparatus as defined in claim 1, wherein the density of coloring material in the first ink is 1 wt % to 5 wt %, and the density of coloring material in the second ink is 6 wt % to 20 wt %.

10. The inkjet recording apparatus as defined in claim 1, further comprising a drive signal application device which applies drive signals of a same drive waveform to the first ejection device and the second ejection device, in order to eject the droplet to form the first dot and the droplet to form the second dot.

11. An inkjet recording method of forming an image on a recording medium, comprising:

a first ejection step of ejecting a droplet of a first ink; and a second ejection step of ejecting a droplet of a second ink, the first and second inks being of a same color type, a density of coloring material in the first ink being lower than a density of coloring material in the second ink, wherein, when droplet volume (ejection volume) of the first ink per dot is equal to droplet volume of the second ink per dot, a diameter of a first dot formed by the droplet ejected in the first ejection step is smaller than a diameter of a second dot formed by the droplet ejected in the second ejection step.

12. An inkjet recording apparatus, comprising:

a first ejection device which ejects a droplet of a first ink; and a second ejection device which ejects a droplet of a second ink, the first and second inks being of a same color type, a density of coloring material in the first ink being lower than a density of coloring material in the second ink, wherein a diameter of a first dot formed by the droplet ejected from the first ejection device is smaller than a diameter of a second dot formed by the droplet ejected from the second ejection device, further comprising a treatment liquid deposition device which deposits a treatment liquid onto the recording medium, the treatment liquid insolubilizing the coloring material or preventing dispersion of the coloring material, and wherein an angle of contact of the first ink with respect to the treatment liquid having been deposited on the recording medium is greater than an angle of contact of the second ink with respect to the treatment liquid having been deposited on the recording medium.

* * * * *